United States Patent
Gaffe et al.

(10) Patent No.: US 11,273,813 B2
(45) Date of Patent: Mar. 15, 2022

(54) ELECTRIC MOTOR BRAKE ASSIST SYSTEM

(71) Applicant: Robert Bosch GmbH, Stuttgart (DE)

(72) Inventors: Francois Gaffe, La Turballe (FR); Philippe Richard, Chelles (FR)

(73) Assignee: Robert Bosch GmbH, Stuttgart (DE)

( * ) Notice: Subject to any disclaimer, the term of this patent is extended or adjusted under 35 U.S.C. 154(b) by 122 days.

(21) Appl. No.: 15/759,789

(22) PCT Filed: Sep. 5, 2016

(86) PCT No.: PCT/EP2016/070844
§ 371 (c)(1),
(2) Date: Mar. 13, 2018

(87) PCT Pub. No.: WO2017/045953
PCT Pub. Date: Mar. 23, 2017

(65) Prior Publication Data
US 2018/0345932 A1    Dec. 6, 2018

(30) Foreign Application Priority Data
Sep. 14, 2015 (FR) .................................... 1558552

(51) Int. Cl.
*B60T 11/18* (2006.01)
*F16H 25/20* (2006.01)

(52) U.S. Cl.
CPC .......... *B60T 11/18* (2013.01); *F16H 25/2015* (2013.01)

(58) Field of Classification Search
CPC ...... B60T 11/18; B60T 13/569; B60T 13/745; F16H 25/2015
See application file for complete search history.

(56) References Cited

U.S. PATENT DOCUMENTS

| | | | |
|---|---|---|---|
| 5,425,286 A | 6/1995 | Laue | |
| 6,826,999 B2 * | 12/2004 | Verbo | B60T 13/57 91/369.2 |

(Continued)

FOREIGN PATENT DOCUMENTS

| | | |
|---|---|---|
| CN | 103802814 A | 5/2014 |
| DE | 102007051199 A1 | 4/2009 |

(Continued)

OTHER PUBLICATIONS

International Search Report dated Nov. 22, 2016, of the corresponding International Application PCt/EP2016/070844 filed Sep. 5, 2016.

*Primary Examiner* — Xuan Lan Nguyen
(74) *Attorney, Agent, or Firm* — Norton Rose Fulbright US LLP; Gerard Messina

(57) ABSTRACT

A system includes a helper piston that includes an axial sleeve that is integral with a guide bracket and that has a threaded exterior surface; a translationally fixed but rotational translation nut that has internal threads that complement those of the helper piston and that supports a gear connected to a drive motor; a plunger piston pushed by the helper piston and connected to a control rod; a trigger spring between the helper piston and the stop carried by the control rod for triggering brake assistance; a stop including a stop sleeve and a flange that is applied to the trigger spring, where the body of the control rod has a crimping area for securing the stop by crimping in an adjusted compression position.

6 Claims, 4 Drawing Sheets

(56) References Cited

U.S. PATENT DOCUMENTS

| | | | | |
|---|---|---|---|---|
| 7,032,496 B2 * | 4/2006 | Schramm | ................ | B60T 13/57 91/369.2 |
| 8,919,239 B2 * | 12/2014 | Richard | ................. | B60T 11/18 91/369.2 |
| 2014/0331666 A1 * | 11/2014 | Zhang | ................... | B60T 13/745 60/545 |

FOREIGN PATENT DOCUMENTS

| | | | | |
|---|---|---|---|---|
| EP | 1346895 A1 | | 9/2003 | |
| EP | 1431152 A1 | | 6/2004 | |
| EP | 1538050 A1 | * | 6/2005 | ............ B60T 13/575 |
| FR | 2947228 A1 | | 12/2010 | |
| WO | 2011099277 A1 | | 8/2011 | |
| WO | 2013083039 A1 | | 6/2013 | |

* cited by examiner

ELECTRIC MOTOR BRAKE ASSIST SYSTEM

CROSS-REFERENCE TO RELATED APPLICATIONS

The present application is the national stage of International Pat. App. No. PCT/EP2016/070844 filed Sep. 5, 2016, and claims priority under 35 U.S.C. § 119 to FR 1558552, filed in the France on Sep. 14, 2015, the content of each of which are incorporated herein by reference in their entireties.

FIELD OF THE INVENTION

The present invention relates to a brake assist system with an electric motor cooperating with a master cylinder and having, along an axis: a helper piston in the shape of an axial sleeve integral with a rotationally fixed bracket for translational guidance, the sleeve having a threaded outside surface, a nut, fixed in translation but free to rotate, having internal threads that complement those on the helper piston, which it receives, and externally having a gear connected to the drive gear motor, a plunger piston whose front extremity has a drive base that can be pushed by the helper piston and whose rear extremity is connected to the control rod, with a trigger spring between the helper piston and a stop carried by the control rod to trigger assistance, the control rod being formed of a body one end of which is connected to the plunger piston and the other end of which is equipped with a head. The present invention also relates to a method for providing a brake assist system with an electric motor.

BACKGROUND

Brake assistance systems with an electric motor are known in which a control rod connected to the plunger piston is formed from two parts, a rod body and, at the extremity not connected to the plunger piston, a head with a ball stud for connecting to the rod coming from the brake pedal. The head of the control rod is a part matched to the manufacturing client, based on the requirements of the type of installation for a given vehicle model. The ball stud is designed to overcome any possible alignment fault in the brake pedal rod associated with the installation or with the variable orientation imposed on the rod by the movement of the brake pedal. The connection to the ball stud makes it possible to transmit the thrust component alone along the axis of the helper system rather than the transverse forces.

The control rod consists of two parts to accommodate, during assembly, passage of the plunger piston and the body of the control rod through the helper piston, the head then being attached to the corresponding end of the body of the control rod.

To trigger the assist, an extremity of the trigger spring presses against the sleeve of the helper piston, while its other extremity is held in place on the control rod by a lock washer installed in a specific position on the control rod. The trigger spring is selected as a function of the trigger force required by the brake assist system.

However, the assist trigger force is determined by the manufacturers at different values, depending on the vehicle type or other criteria that they use.

Consequently, a large number of trigger springs are required for helper systems based on the manufacturers' requirements.

SUMMARY

An object of the present invention is the improvement of a brake assist system through simplification of the structure in order to provide large-scale consistency and to make installation easier and faster.

To that end, according to an example embodiment of the present invention, a brake assist system includes a stop formed from a sleeve that can be secured to the control rod and from a flange for application against the trigger spring, the body of the control rod having, for positioning the stop of the trigger spring, a crimping area for securely crimping the trigger spring stop in the adjusted compression position.

Thus, the invention enables the simple realization of assist systems using the same compression spring, but modified on a case-by-case basis depending on the trigger force desired for a given vehicle type. This common base enables the use of large-scale manufacturing, requiring only the adjustment of the trigger spring at the time of its installation at the adjusted value, which is then secured by crimping. The crimping area can be determined within the adjustment range of the trigger force using the same spring. This is very easily accomplished by machining, and the length of the machined crimping area does not have an influence on the time and cost of manufacture. Crimping the spring stop is accomplished through the use of a crimping tool with the stop in the adjusted position. This position is programmed as a function of the different trigger forces. Crimping ensures that the assembly is suitably rigid, thereby avoiding any distortion of the trigger force.

The crimping area of the rod is an area that is not smooth, extending a length corresponding to the adjustment range of the trigger spring between a minimum recommended value and a maximum recommended value, respectively corresponding to the minimum trigger force and the maximum trigger force required by the manufacturers, the crimping area advantageously including of a knurled or grooved surface for efficaciously securing the trigger spring stop by its crimping sleeve in the longitudinal direction of the control rod.

In another aspect, according to an example embodiment of the present invention, a method of providing a brake assist system of the type described above results in a control rod equipped with a crimping area corresponding to the adjusted attachment range of the trigger spring stop, the spring stop having a sleeve and a flange that presses against the spring, the sleeve having a diameter that accommodates the body of the control rod. The method includes installing the assembled control rod on the plunger piston in the sleeve of the helper piston, fitting the trigger spring on the control rod resting against the extremity of the helper piston sleeve, fitting the stop on the rod against the trigger spring, compressing the trigger spring with the stop at the recommended compression to obtain the required trigger force, crimping the stop sleeve on the crimping area at the location where the spring was compressed at the recommended compression force, and attaching the head of the control rod.

The manufacturing process for the brake assist system according to the invention has an advantage of being very simple to implement and requiring a reduced number of parts, none of which are required for a specific type of helper system trigger force.

Within the adjustment range, the assist system uses a single trigger spring prestressed at the suitable prestress force, based on the trigger force that the brake system requires.

This trigger force varies from one type to another and requires neither a specific spring nor a specific spring stop based on the trigger forces to be obtained with those same elements.

The present invention will be described below in greater detail with respect to an example of a brake assist system with an electric motor, as shown in the attached drawings.

DETAILED DESCRIPTION

By convention, the left side, following axis XX in the various figures, is the front (AV) and the right side is the back (AR).

Figure 1:
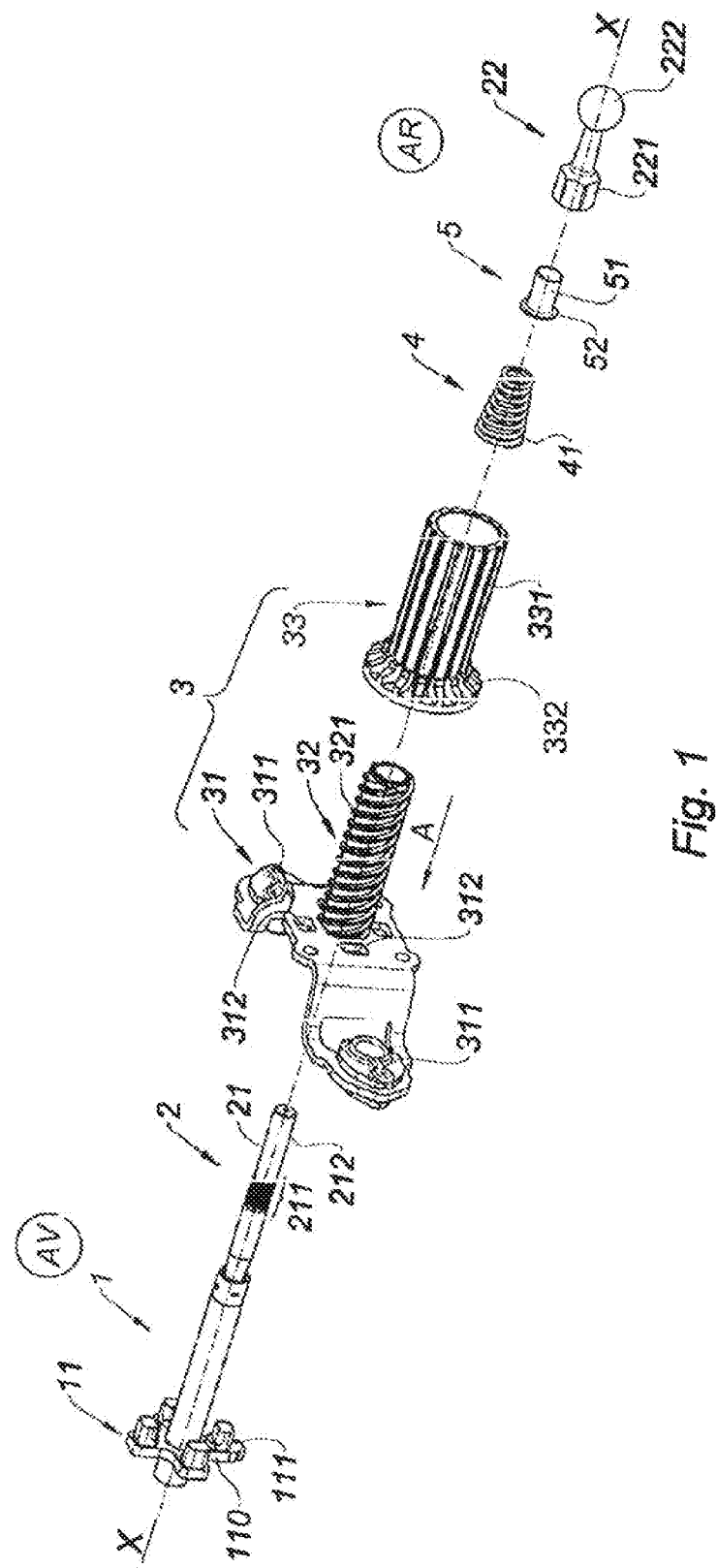
FIG. 1 is an exploded view of a portion of the brake assist system including a plunger piston, a control rod of a helper piston, and a trigger spring, aligned along an xx axis of the system, according to an example embodiment of the present invention.

According to the exploded view of FIG. 1, the brake assist system according to an example embodiment of the present invention, of which only certain elements needed for the description are shown, is composed of a master cylinder (for example, a tandem master cylinder) supplying one or two brake circuits with pressurized brake fluid. The master cylinder is controlled from the brake pedal by a kinematic chain incorporating an actuator in the form of an electric motor generally acting alone or in association with the thrust of the pedal to develop the thrust exerted on the primary piston of the master cylinder by means of the pushrod and the reaction disk against which the helper piston pushes through an intermediary piston and, in parallel, the plunger piston, which can also push the reaction disk under certain conditions. These elements are not shown.

The kinematic chain, aligned along line of action xx and beginning from the master cylinder side, or the front (AV), includes plunger piston 1 connected to control rod 2 traversing helper piston 3 and connected to the brake pedal at the rear (AR).

Plunger piston 1 cooperates with helper piston 3 while being directly connected to control rod 2. Helper piston 3 has guide bracket 31, rotationally fixed, accommodating threaded sleeve 32, which accommodates nut 33. Helper piston 3, traversed by plunger piston 1 and control rod 2, is supported on the xx axis by bracket 31, equipped with two symmetrical bearings 311 to slide on two guide rods (not shown), parallel to the xx axis. Helper piston 3 is pushed in the direction of assistance (arrow A) through the cooperation of threaded sleeve 32 and the threads of nut 33. The latter, fixed in translation in the direction of axis xx, has interior threads for screwing onto threads 321 of sleeve 32 of helper piston 3. Nut 33 has flange 332, which serves as a support for bracket 31 while in a rest position, when it is pulled back by a spring. Flange 332 also serves as a support for the guide stops of drive base 11 of plunger piston 1, as described below.

The interior of nut 33 has threads only for a certain length, starting from flange 332, the remainder being smooth. The length of nut 33 serves to cover threaded sleeve 32. Along the exterior, nut 33 has grooves 331 to accommodate a drive gear (not shown) that is integral in rotation. Grooves 331 extend for the entire length of nut 33 for installation of the drive gear, which is equipped with complementary grooves. It is associated with the helper motor. Helper piston 3 presses on drive base 11 integral with plunger piston 1 to push the latter against the master cylinder (arrow A).

Drive base 11 consists of a cross-brace that includes branches 110 equipped with guide stops 111 in the direction of axis xx, and which are received in bores 312 of bracket 31. When at the end-of-travel position, guide stops 111 press against flange 332 of nut 33. In an example, one of the branches also carries a lug parallel to axis xx and cooperating with a trigger sensor to actuate the helper motor after an empty stroke at the start of an assisted braking operation. This empty stroke corresponds to the start of the actuator movement of the helper system before reaching the trigger threshold.

Plunger piston 1 is mounted on control rod 2 formed from body 21 and head 22. The front extremity of body 21 is fixed to the rear extremity, the side not turned to the master cylinder, of plunger piston 1; its rear extremity accommodates head 22, formed of sleeve 221 terminated by ball stud 222 connected to the rod coming from the brake pedal. Body 21 of the control rod has crimping area 211, formed by an annular surface that is not smooth, for example, knurled in the form of peripheral grooves or channels. Crimping area 211 extends over a given length, which constitutes the adjustment range, to affix, in adjusted fashion, stop 5 of trigger spring 4. This positioning takes place within the range of possible adjustments between the two extreme values.

Installation takes place by assembling, along axis xx, plunger piston 1 with body 21 of control rod 2, then the plunger piston in helper piston 3 and translation nut 33. Trigger spring 4 is press fit to rear extremity 212 of the rod exiting sleeve 32 to engage with edge 322. Stop 5, which has sleeve 51 and flange 52 is then fit to extremity 212 up to crimping area 211. Spring 4 is then compressed to the recommended force based on the trigger force to be obtained and stop 5 is crimped in this position onto area 211 of rod 21. And, finally, sleeve 221 of the head is assembled at extremity 212 of body 21 of the rod.

Figure 2:
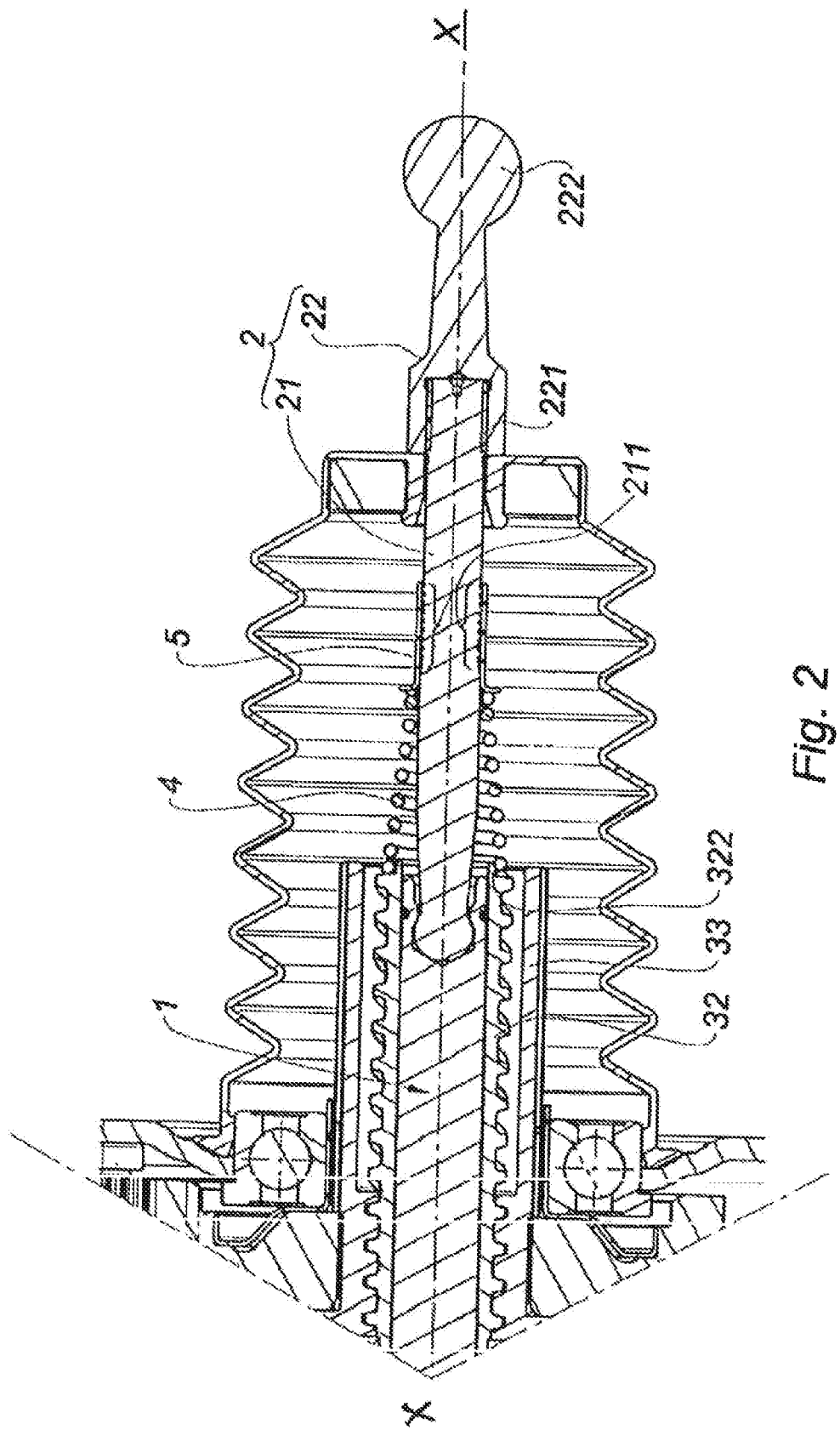
FIG. 2 is a partial axial cutaway of the plunger piston and the control rod, along with the assembly including a stop for the trigger spring, according to an example embodiment of the present invention.

FIG. 2 illustrates, in axial cutaway, installation of trigger spring 4 with its stop 5 affixed in adjusted manner to crimping area 211.

The extremity of threaded sleeve 32 forms shoulder 322 accommodating first turn 41 of trigger spring 4 pushed by stop 5, crimped to crimping area 211 of rod 21.

FIGS. 3A-3D show, in perspective, four steps in the assembly of spring 4 and stop 5, followed by crimping on crimping area 211.

Figure 3A:
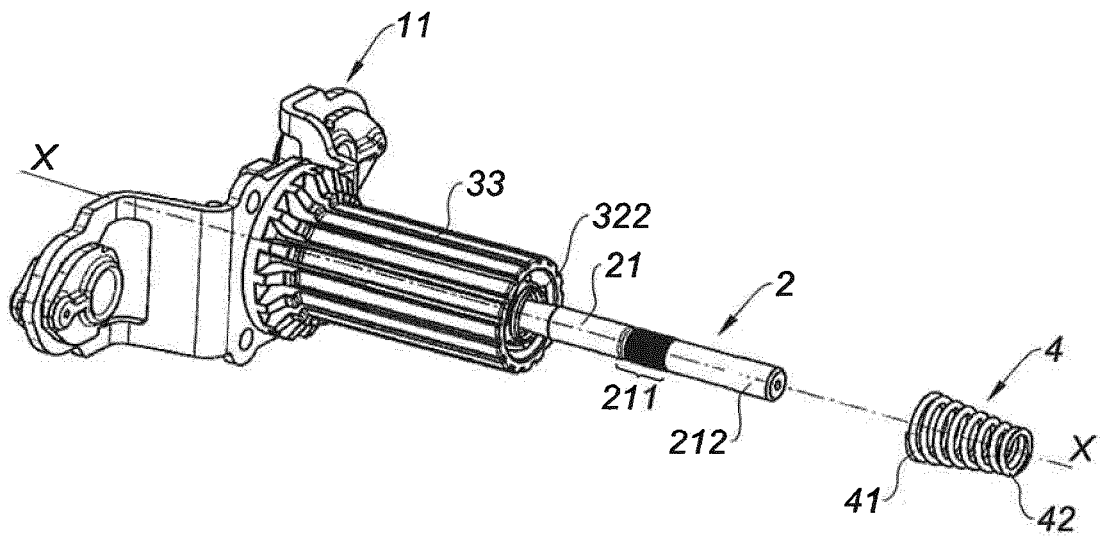
FIGS. 3A-3E illustrate steps for assembling the plunger piston, the control rod, and the trigger spring according to the an example embodiment of the present invention.

As shown in FIG. 3A, spring 4 is fitted to body 21 of rod 1 by placing first turn 41 on shoulder 322 of threaded sleeve 32.

Figure 3B:
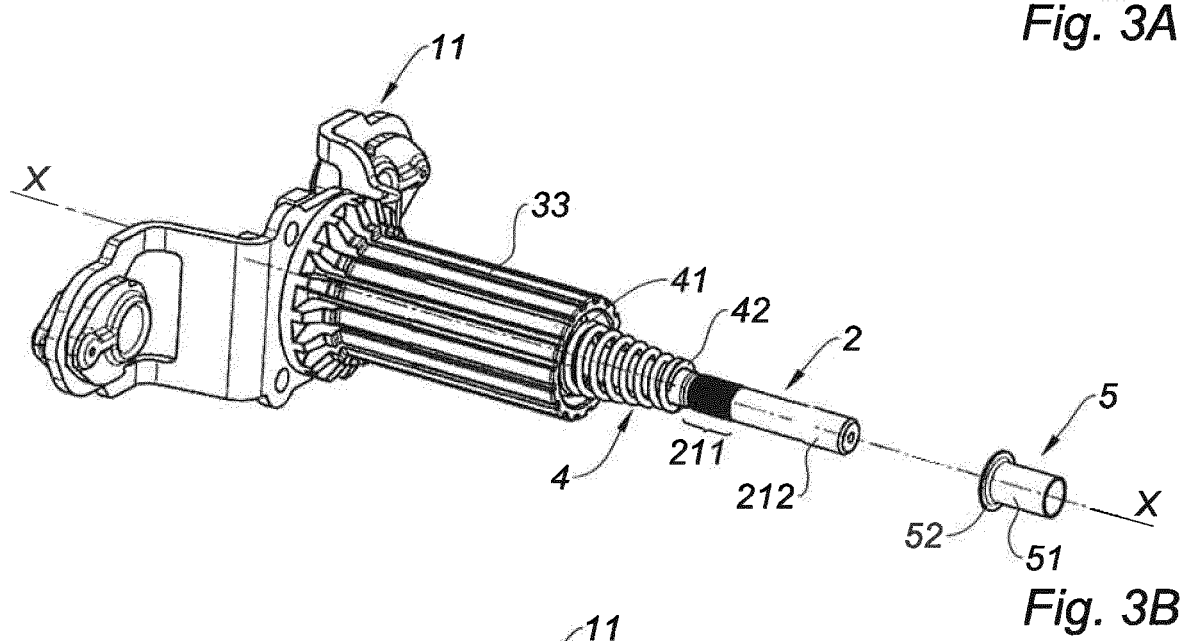

As shown in FIG. 3B, stop 5 is engaged on body 21 by pressing flange 52 against free extremity 42 of spring 4.

Figure 3C:
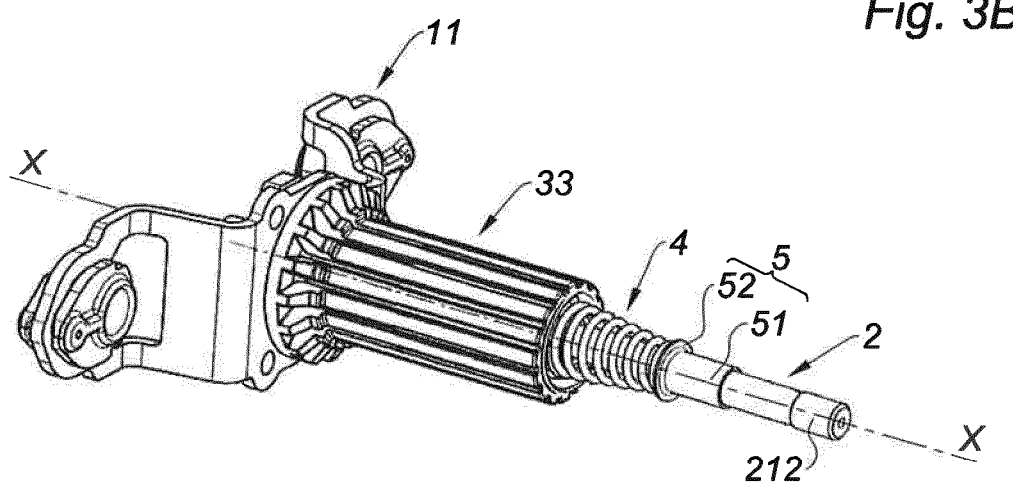

FIG. 3C shows stop 5 in place, compressing spring 4 at the required adjustment force. Threaded sleeve 32, against which spring 4 presses, is itself fixed to accommodate this recommended force. Tightening means are not represented. Sleeve 51 of the stop is crimped in this state of axial compression of spring 4.

Figure 3D:
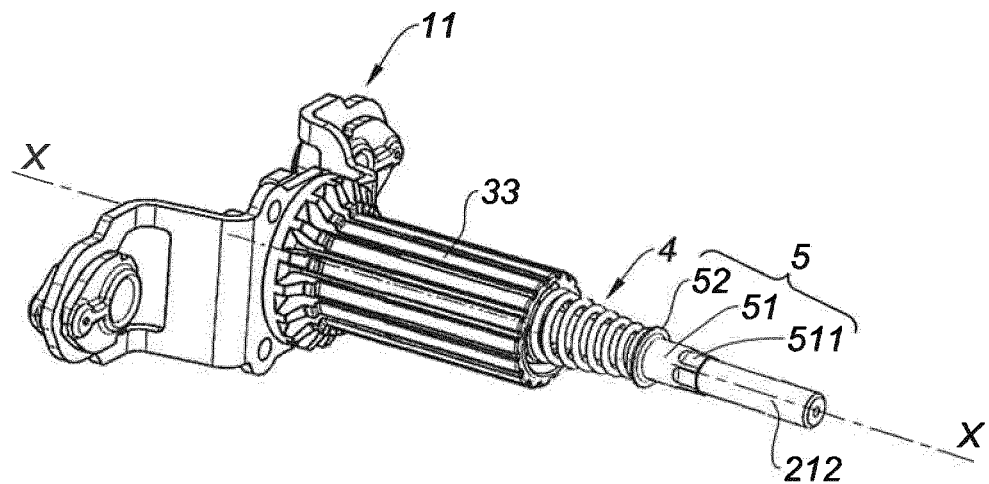

FIG. 3D shows sleeve 51 crimped, with crimping facets 511, which are the imprint of the crimping tool.

The following step involving installation of head 22 on extremity 212 is not shown.

Figure 3E:
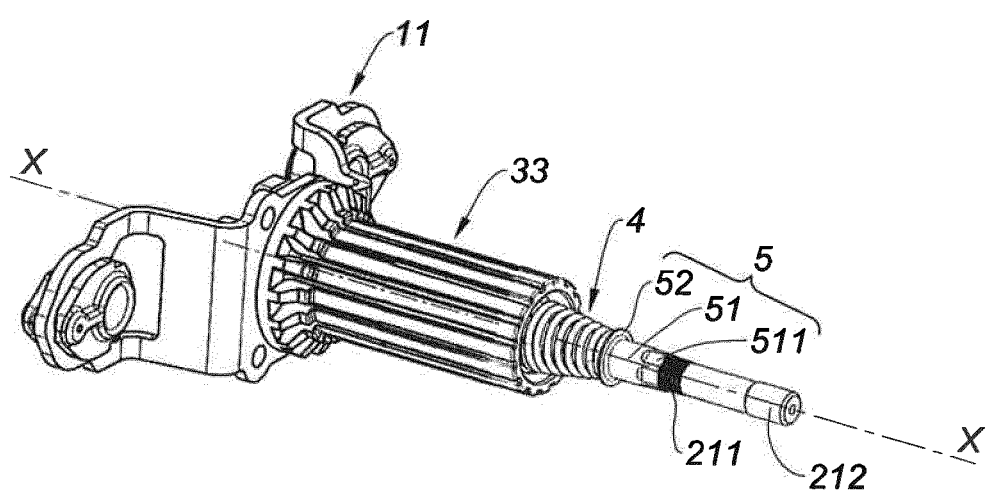

FIG. 3E shows stop 5 crimped to the extremity of crimping area 211, spring 4 being more strongly prestressed than it is in FIG. 3D.

Once assembled (FIGS. 3D, 3E), the assembly is then combined with the other components of the brake assist system.

The invention claimed is:

1. A brake assist system for a master cylinder, the system comprising:
    a helper piston that includes an axial piston sleeve whose exterior surface is threaded with a first thread and that is integral with a rotationally fixed bracket for guidance in translation;
    a translationally fixed and rotatable nut in which the axial piston sleeve is received and that (a) is interiorly threaded with a second thread that complements the first thread and (b) includes, at its exterior, a gear connected to an electric drive motor;
    a control rod that includes, at a compression position, a crimping area;
    a stop that includes (a) a stop sleeve securing the stop on the control rod at the crimping area and (b) a flange, wherein the control rod is inserted into the stop sleeve such that the stop is crimped onto the crimping area of the control rod, an interior surface of the stop sleeve directly contacting the crimping area;
    a plunger piston that (a) includes, at a front extremity of the plunger piston, a drive base that is movable by the helper piston and (b) at a back extremity of the plunger piston, is directly connected to a first extremity of a body of the control rod;
    a trigger spring arranged between the helper piston and the stop to trigger assistance and that is applied against the flange of the stop; and
    a head arranged at a second extremity of the body of the control rod, wherein the crimping area extends for a length corresponding to an adjustment range of the trigger spring between a minimum value and a maximum value respectively corresponding to a minimum trigger force and a maximum trigger force for the trigger spring, the stop being crimped onto the control rod at a location of the crimping area disposed between the minimum value and the maximum value.

2. The brake assist system of claim 1, wherein a surface of the control rod in the crimping area is knurled or grooved.

3. The brake assist system of claim 1, wherein the stop sleeve is crimped, thereby securing the stop at a location in the crimping area.

4. A method of providing a brake assist system, the method comprising:
    installing a control rod having a body that includes a first extremity, the first extremity being directly connected to a back extremity of a plunger piston, in an axial piston sleeve of a helper piston configured to push a drive base arranged at a front extremity of the plunger piston, wherein an exterior surface of the piston sleeve is threaded with a first thread, the piston sleeve is integral with a rotationally fixed bracket for guidance in translation, and the piston sleeve is received in a translationally fixed and rotatable nut that (a) is interiorly threaded with a second thread that complements the first thread and (b) includes, at an exterior of the nut, a gear connectable to an electric drive motor;
    fitting a trigger spring onto the control rod with the trigger spring being supported by a back extremity of the piston sleeve;
    fitting a spring stop, which includes (a) a flange and (b) a stop sleeve whose diameter is larger than a diameter of the body of the control rod for accommodating the control rod in the stop sleeve, onto the control rod with the flange applied against the trigger spring, wherein the control rod is inserted into the stop sleeve such that the spring stop is crimped onto a crimping area of the control rod, an interior surface of the stop sleeve directly contacting the crimping area;
    moving the spring stop against the trigger spring, thereby compressing the trigger spring, until reaching, in a crimping area of the control rod, a location at which the trigger spring is compressed to a compression by which to obtain a setpoint trigger force by the trigger spring that is arranged between the helper piston and the stop to trigger assistance;
    crimping the stop sleeve onto the body of the control rod at the location, thereby securing the spring stop at the location in the crimping area of the control rod; and
    subsequently attaching a head to a second extremity of the body, wherein the crimping area extends for a length corresponding to an adjustment range of the trigger spring between a minimum value and a maximum value respectively corresponding to a minimum trigger force and a maximum trigger force for the trigger spring, the stop being crimped onto the control rod at a location of the crimping area disposed between the minimum value and the maximum value.

5. The brake assist system of claim 1, wherein the crimping area of the control rod is less smooth than a remaining portion of the control rod.

6. The method of claim 4, wherein the crimping area of the control rod is less smooth than a remaining portion of the control rod.

* * * * *